(12) United States Patent
Grewe et al.

(10) Patent No.: US 8,713,761 B2
(45) Date of Patent: May 6, 2014

(54) HANDLEBAR COUPLING AND ADJUSTMENT UNIT

(75) Inventors: Brian D. Grewe, Conyers, GA (US); Stephen C. Price, Barnesville, GA (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 15 days.

(21) Appl. No.: 13/403,975

(22) Filed: Feb. 23, 2012

(65) Prior Publication Data

US 2013/0220067 A1 Aug. 29, 2013

(51) Int. Cl.
*B62D 51/00* (2006.01)
(52) U.S. Cl.
USPC .............................. 16/437; 16/441; 29/525.02
(58) Field of Classification Search
USPC ............... 16/437, 441; 280/47.371; 15/144.1; 248/292.12; 411/347; 403/108, 154, 403/155, 322.1, 324, 325; 29/434, 525.02
See application file for complete search history.

(56) References Cited

U.S. PATENT DOCUMENTS

| | | | |
|---|---|---|---|
| 1,896,442 A * | 2/1933 | Farmer | 56/249 |
| 2,658,322 A * | 11/1953 | Sullivan | 56/249 |
| 2,727,753 A | 12/1955 | Johnson | |
| 2,821,258 A | 1/1958 | Benson | |
| 2,868,034 A | 1/1959 | Cole | |
| 3,038,737 A | 6/1962 | Lill | |
| 3,357,716 A | 12/1967 | Musichlik | |
| 3,423,103 A | 1/1969 | Maltarp | |
| 3,481,123 A | 12/1969 | Lessig | |
| 3,485,017 A | 12/1969 | Duran | |
| 3,534,432 A | 10/1970 | Davies | |
| 3,604,187 A | 9/1971 | Weber | |
| 3,649,997 A | 3/1972 | Thorud | |
| 3,694,855 A | 10/1972 | Meyer | |
| 3,743,313 A | 7/1973 | Koch | |
| 3,797,213 A | 3/1974 | Sadow, Jr. | |
| 3,816,873 A | 6/1974 | Thorud | |
| 3,817,547 A | 6/1974 | Erickson | |
| 3,950,817 A | 4/1976 | McKaig | |
| 4,006,914 A | 2/1977 | Koch | |
| 4,108,456 A | 8/1978 | Woelffer | |
| 5,101,617 A | 4/1992 | Hare | |
| 5,163,275 A | 11/1992 | Hare | |
| 5,606,851 A | 3/1997 | Bruener | |
| 5,619,845 A | 4/1997 | Bruener | |
| 5,636,504 A | 6/1997 | Kaley | |
| 5,653,096 A | 8/1997 | Edwards | |

(Continued)

FOREIGN PATENT DOCUMENTS

WO WO9902388 A1 1/1999

*Primary Examiner* — William Miller
(74) *Attorney, Agent, or Firm* — Rathe Lindenbaum LLP; Ken Lemke (57) ABSTRACT

A handlebar coupling and adjustment unit comprises a housing, a pivot pin, a manual grip and a retaining pin. The housing receives an end portion of a handlebar. The pivot pin joins the housing to the handlebar and pivotally supports the handle relative to the handle bracket. The retaining pin is connected to the manual grip and is linearly translatable in a first direction from an extended positioned projecting beyond the housing to a withdrawn position within the housing. The manual grip is rotatable while the retaining pin is in the withdrawn position between a locked position in which the housing holds the manual grip with the retaining pin in the withdrawn position and an unlocked positioned in which the manual grip is linearly translatable in a second direction to return the retaining pin to the extended position.

21 Claims, 13 Drawing Sheets

(56) References Cited

U.S. PATENT DOCUMENTS

| | | | |
|---|---|---|---|
| 5,842,329 A * | 12/1998 | Carter .............................. 56/2 |
| 6,257,647 B1 | 7/2001 | Ninness |
| 6,708,473 B2 | 3/2004 | Nicolay |
| 7,159,377 B2 | 1/2007 | Ross |
| 7,231,755 B2 | 6/2007 | Clarke |
| 7,412,753 B2 | 8/2008 | Osborne |
| 7,496,990 B2 | 3/2009 | Qiao |
| 7,958,712 B2 | 6/2011 | Cheung |
| 7,975,359 B2 | 7/2011 | Osborne |
| 8,316,510 B2 * | 11/2012 | Anraku et al. ............. 16/437 |
| 2012/0009043 A1 * | 1/2012 | Osborne et al. ............ 411/347 |

* cited by examiner

HANDLEBAR COUPLING AND ADJUSTMENT UNIT

BACKGROUND

Many implements include handlebars by which a person pushes or steers an implement. In some implements, the angle at which handlebar extends from implement is adjustable. Existing mechanisms that connect the handlebar to the implement and allow for its angular adjustment are complex, requiring numerous parts, and may be difficult to assemble.

DETAILED DESCRIPTION OF THE EXAMPLE EMBODIMENTS

Figure 1:
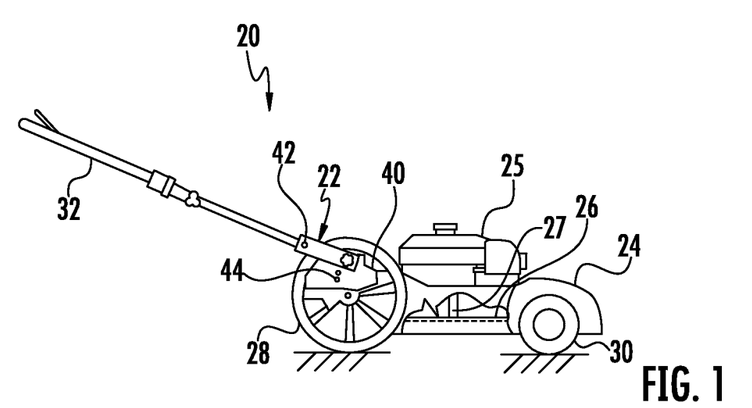
FIG. 1 is a side elevational view of an example implement including an example handlebar mounting system.

FIG. 1 illustrates an example implement 20 (shown as a gas powered walk behind mower) having an example handlebar mounting system 22. As will be described hereafter, mounting system 22 pivotally connects handlebar 32 to the frame or deck 24 while allowing the angle at which handlebar 32 extends from deck 24 to be adjusted. As will be described hereafter, mounting system 22 pivotally connects the handlebar 32 to implement 20 and allows for angular adjustment of the handlebar 32 by a unit 42, 242 that utilizes fewer parts and that may be preassembled as a single unit prior to being connected to handlebar 32. As a result, inventory and unit costs may be reduced.

In addition to mounting system 22, implement 20 comprises deck 24, engine 25, working tool 26 (shown as a cutting blade in the example illustrated), wheels 28, 30, handlebar 32.

Deck 24 comprises one or more structures serving as a base, support and a shield. Deck 24 serves as a base upon which engine 38 is mounted. Deck 24 supports wheels 28, 30 and handlebar 32. Deck 24 further at least partially surrounds and shields working tool 26. Deck 24 may have a variety different sizes, shapes and configurations.

Working tool 26 comprises a member driven by engine 25 to carry out a predefined function. In the example illustrated, working tool 26 comprises one or more blades configured to be rotationally driven by engine 40 about a substantially vertical axis 44 when cutting grass. In other implementations, working tool 26 may comprise a pump, such as when implement 20 comprises a pressure washer or may comprise an auger or blade, such as when implement 20 comprises a snow thrower. In still other implementations, working tool 26 may have other configurations depending upon implement 20.

Rear wheels 28 and front wheels 30 comprise a pair front wheels and a pair of rear wheels coupled to and supported by deck 24 so as to rollably support deck 24 for movement over a terrain. In one implementation, each of rear wheels 28 and front wheels 30 freely idle, not being driven, such as when implement 20 is a push mower. In another embodiment, one or both of rear wheels 28 and front wheels 38 are driven by a transmission powered by engine 25, wherein implement 20 is self-propelled. In other implementations, other ground motive members or terrain engaging members may be utilized in place of wheels 28, 30.

Handlebar 32 comprises one or more members extending from deck 24 by which allow a person to steer or direct mower 20. In embodiments where mower 20 is a push mower, handlebar 32 further facilitates pushing of mower 20. Handle 20 is pivotably coupled to deck 24 for pivotal movement about a pivot axis 48, allowing handlebar 32 to pivot between one or more operational positions. In one example, handlebar 32 comprises an inverted U-shaped bar extending from two lateral side portions of deck 24. In another embodiment, handlebar 32 may comprise a T-shaped bar or may have other shapes or configurations.

Figure 2:
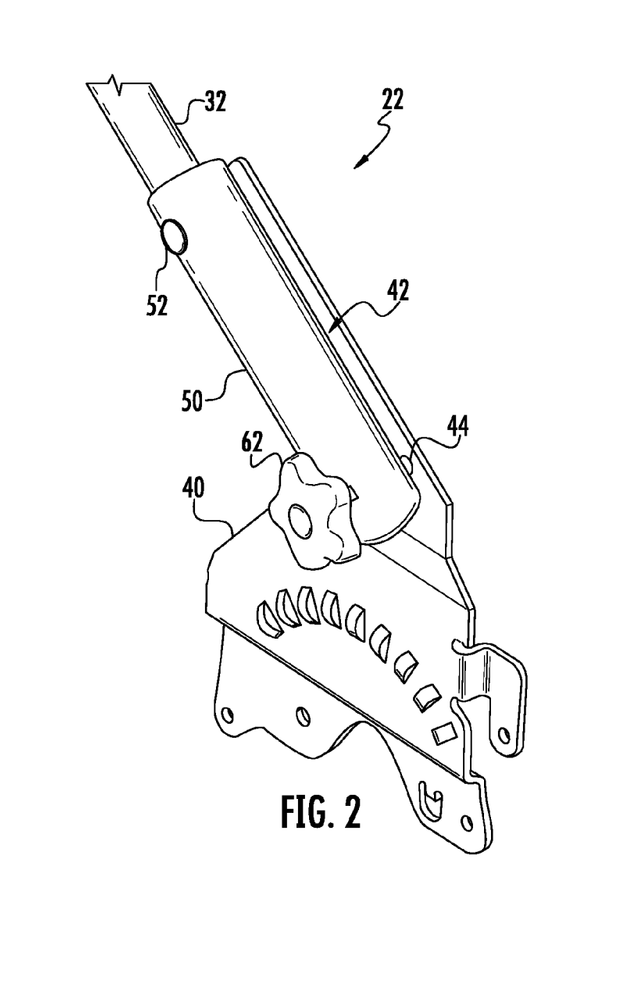
FIG. 2 is an enlarged fragmentary perspective view of the handlebar mounting system of FIG. 1.
Figure 3:
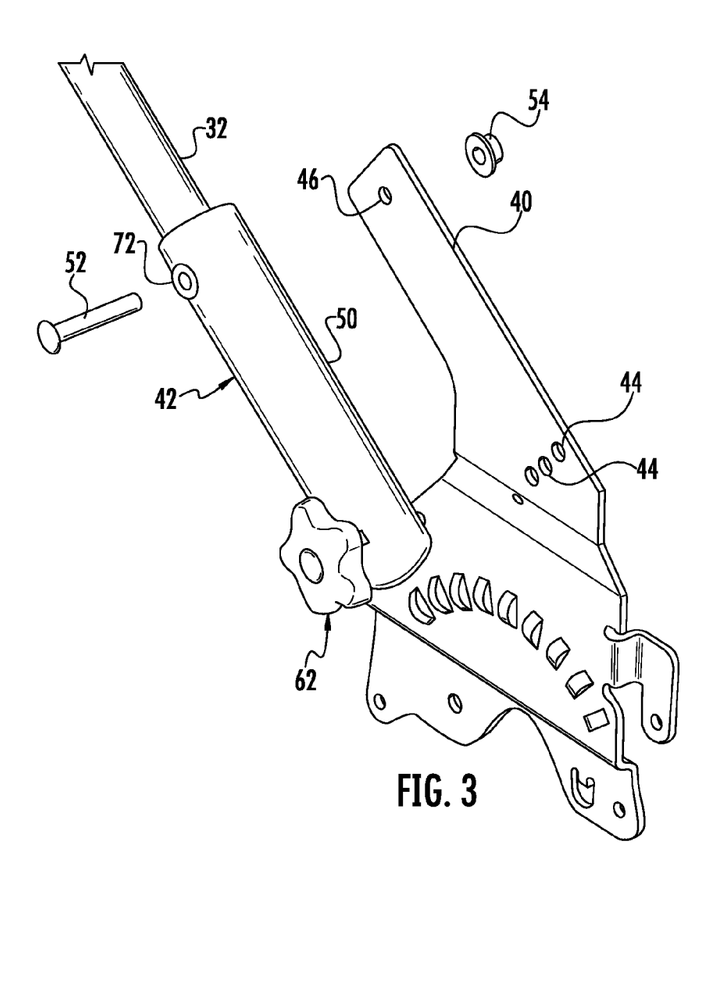
FIG. 3 is a partially exploded perspective view of the handlebar mounting system of FIG. 2.

Handle mounting system 36 comprises a mechanism configured to pivotally connect handlebar 32 to frame or deck 24 and to further allow adjustment of an angle at which handlebar 32 extends from deck 24. Handle mounting system 22 comprises brackets 40 and handlebar coupling and adjustment unit 42. FIGS. 2 and 3 illustrate handle mounting system 36 in more detail. As shown by FIGS. 2 and 3, each bracket 40 comprises a member along which handlebar 32 pivots and provides operational detents 44 and pivot aperture 46. Detents 44 comprise depressions extending into or apertures extending through a face or edge of bracket 40. Detents 44 extend at spaced locations defining different angles for handlebar 32 with respect to deck 24. Each of detents 44 are configured to receive a projecting portion of unit 42.

Pivot aperture 46 comprises an opening through bracket 40 which is sized and located to receive a pivot pin of unit 42.

In the example illustrated, each bracket 40 is formed from a single stamped piece of metal. In other embodiments, bracket 40 may be formed from other materials, and may have other configurations. For example, in other implementations, bracket 40 may additionally include one or more feet for storing implement 20 with deck 24 in a vertical orientation.

Figure 4:
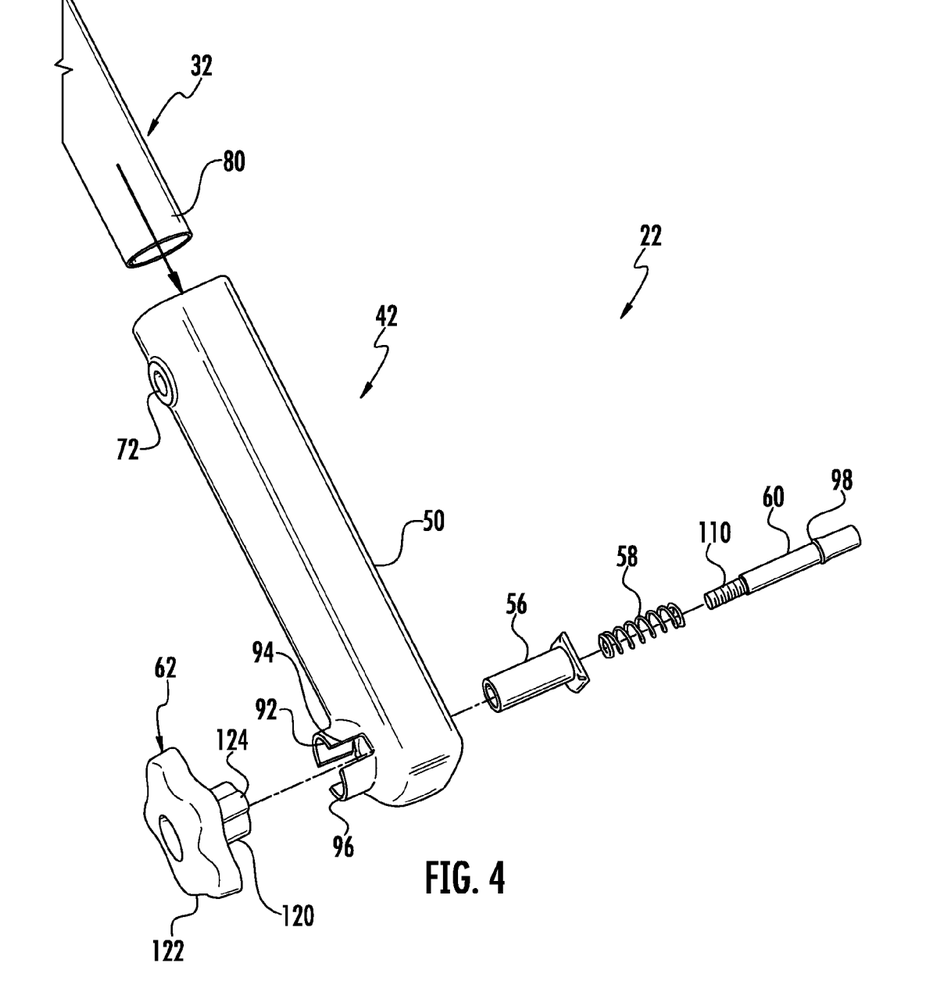
FIG. 4 is an exploded perspective view of an example handlebar coupling and adjustment unit of the handlebar mounting system of FIG. 2.
Figure 5:
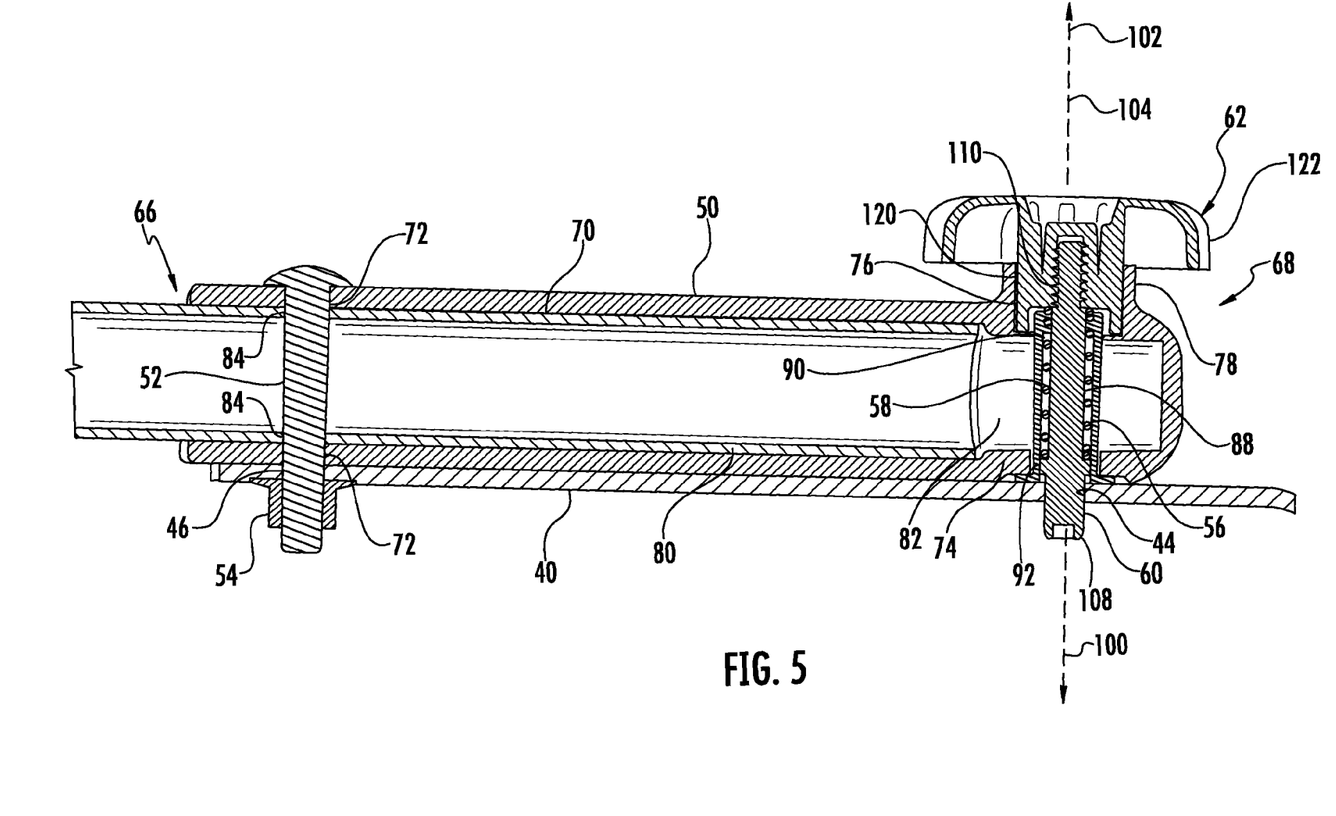
FIG. 5 is a sectional view of the handlebar coupling and adjustment unit of FIG. 2 with a retaining pin in an extended position.

FIGS. 4 and 5 illustrate handlebar coupling and adjustment unit 42 in more detail. Unit 42 comprises a housing 50, pivot pin 52, fastener 54, bushing 56, spring 58, retaining pin 60 and manual grip 62. As shown by FIG. 5, housing 50 is generally an elongate tubular member extending from a first open end 66 to a second opposite closed-end 68. Housing 50 comprises bore 70, apertures 72, opening 74, opening 76 and collar 78. Bore 70 extends from end 66 towards end 68. In the example implementation illustrated, bore 70 is blind, terminating at a closed portion at end 68. Bore 70 receives end portion 80 of handlebar 32 with handlebar 32 abutting an internal shoulder 82 at a location such that when handlebar 32 and shoulder 82 abut, aligned openings 84 in end portion 80 of handlebar 32 also align with apertures 72 in housing 50. As a result, a single, shaft or pivot pin 52 may be inserted through each of openings 84, apertures 72 and pivot aperture 46 of bracket 40 to concurrently secure housing 50 to handlebar 32 and to also pivotally connect handlebar 32 and the attached housing 50 to bracket 40. In the example illustrated, pivot pin 52 is secured in place with the use of a fastener, such as a nut, rivet or other fastening structure or securement method.

Openings 74 and 76 are aligned with one another on opposite sides of housing 50 proximate to end 68. As shown by FIG. 5, opening 74 receives bushing 56 while opening 76 receive a portion of manual grip 62. Bushing 56 comprises a tubular structure received within opening 74 and defining an interior passage 88 for receiving spring 58 and pin 60. Interior passage 88 terminates at a shoulder 90 against which spring 58 may be compressed. In other implementations, passage 88 may be formed in and provided by housing 50, wherein bushing 56 may be omitted.

Collar 78 comprises an annular cylindrical structure extending about opening 76 and comprising a recess 92, one or more side openings 94 and a plateau surface 96. Recess 92 and side openings 94 receive manual grip 62 when manual grip 62 is appropriately rotationally oriented with respect to side openings 94. Plateau surface 96 comprise an axial face of collar 78 that contacts or abuts the lower opposite face of manual grip 62, depending upon the rotation orientation of manual grip 62, to hold or retain manual grip 62 and pin 60 in a withdrawn position.

Spring 58 comprises a compression spring received within passage 88 while extending about pin 60. Spring 58 is captured between shoulder 90 and a shoulder 98 of pin 60. Spring 58 resiliently biases pin 60 and manual grip 62 in the direction indicated by arrow 100 towards an extended position which pin 60 projects beyond housing 50 and through one of apertures 44. In some implementations, spring 58 may be omitted.

Figure 6:
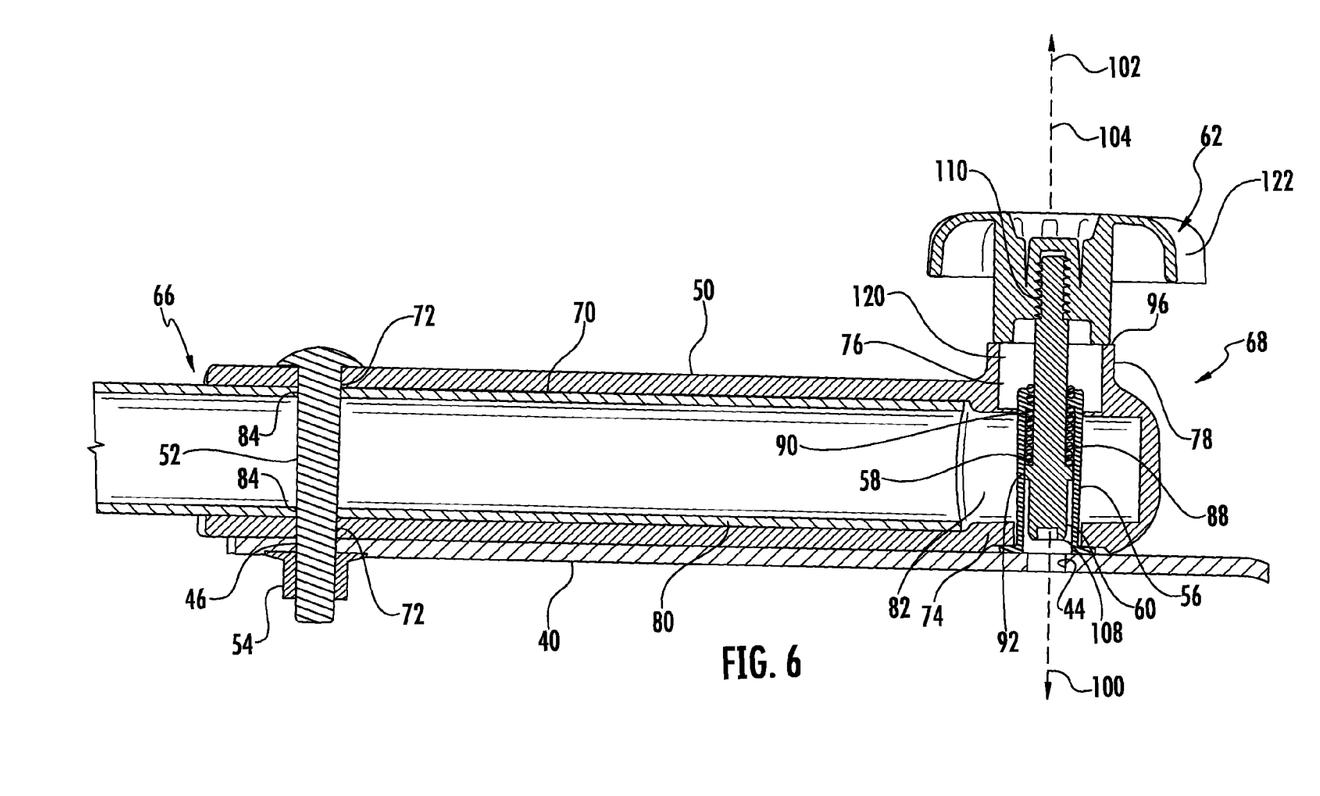
FIG. 6 is a sectional view of the handlebar coupling and adjustment unit of FIG. 2 with a retaining pin in a withdrawn position.

Retaining pin 60 is connected to manual grip 62 and is linearly translatable in a direction 102 along axis 102 from an extended position shown in FIG. 5 in which pin 60 projects into one of detents 44 to a withdrawn position shown in FIG. 6 in which end 108 of retaining pin 60 is flush with or withdrawn into housing 50 and withdrawn from detent 44. In the example implementation, retaining pin 60 comprises shoulder 92 and connecting end 110. Shoulder 92 provides surfaces which captures spring 58 against shoulder 90 of passage 88 provided by bushing 56. Connecting end 110 extends through bushing 56 and out of passage 88 into connection with manual grip 62. In the example illustrated, connecting end 110 is threaded onto manual grip 62. In other implementations, connecting end 110 may be fixedly secured to manual grip 62 by fasteners or other securement techniques.

Manual grip 62 comprises a structure connected to retaining pin 60 for moving pin 60 between the extended position and the retracted position. In the example illustrated, manual grip 62 comprises post 120 and gripping portion 122. Post 120 extends from gripping portion 122 and extends about axis 104 of pin 60 with one or more keying portions 124 (shown in FIG. 4). In the example illustrated, keying portions 124 comprise a pair of opposite outwardly or radially extending ears configured to be received within side openings 94 or to rest upon plateau surface 96 depending upon the rotation orientation of manual grip 62 about axis 104. In other implementations, post 120 may include a single keying portion or keying portions of other configurations. For example, in another implementation, recess 94 may have a polygonal inner surface while post 120 has a corresponding polygonal outer surface, permitting post 120 to be received within recess 94 or to rest upon plateau surface 96 depending upon the rotational position of manual grip 62.

Gripping portion 122 extends from post 120 and has a shape that facilitates both the axial pulling of retaining pin 60 against spring 58 along axis 104 and the rotation of post 120 about axis 104. In the example illustrated, gripping portion 122 comprises a knob symmetrically extending about axis 104. In other implementations, gripping portion 122 may have other shapes and configurations.

Figure 7:
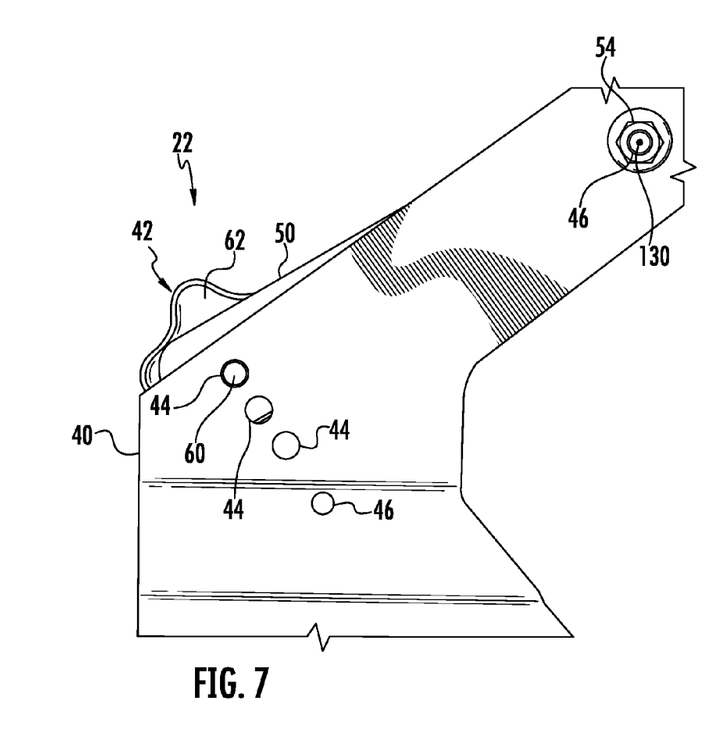
FIG. 7 is a fragmentary elevational view of the handlebar mounting system of FIG. 2 illustrating the handlebar coupling and adjustment unit retaining the handlebar in a first angular position.
Figure 8:
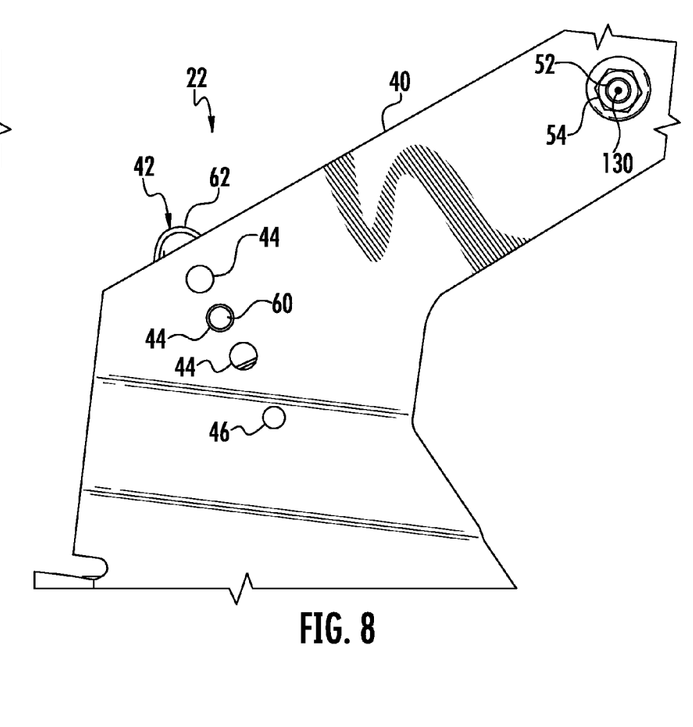
FIG. 8 is a fragmentary elevational view of the handlebar mounting system of FIG. 2 illustrating the handlebar coupling and adjustment unit retaining the handlebar in a second angular position.
Figure 9:
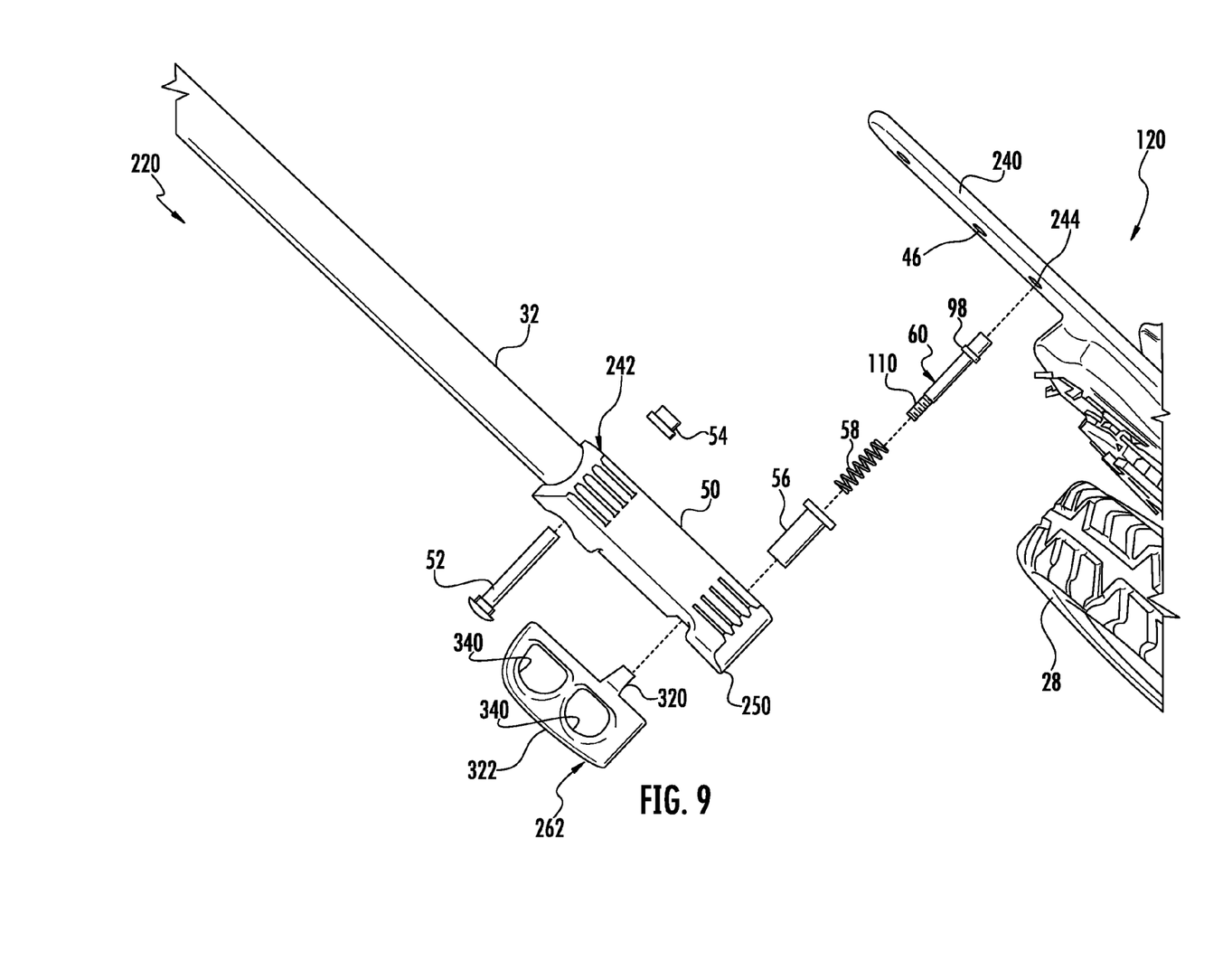
FIG. 9 is an exploded perspective view of another example of the handlebar mounting system of FIG. 2.
Figure 10:
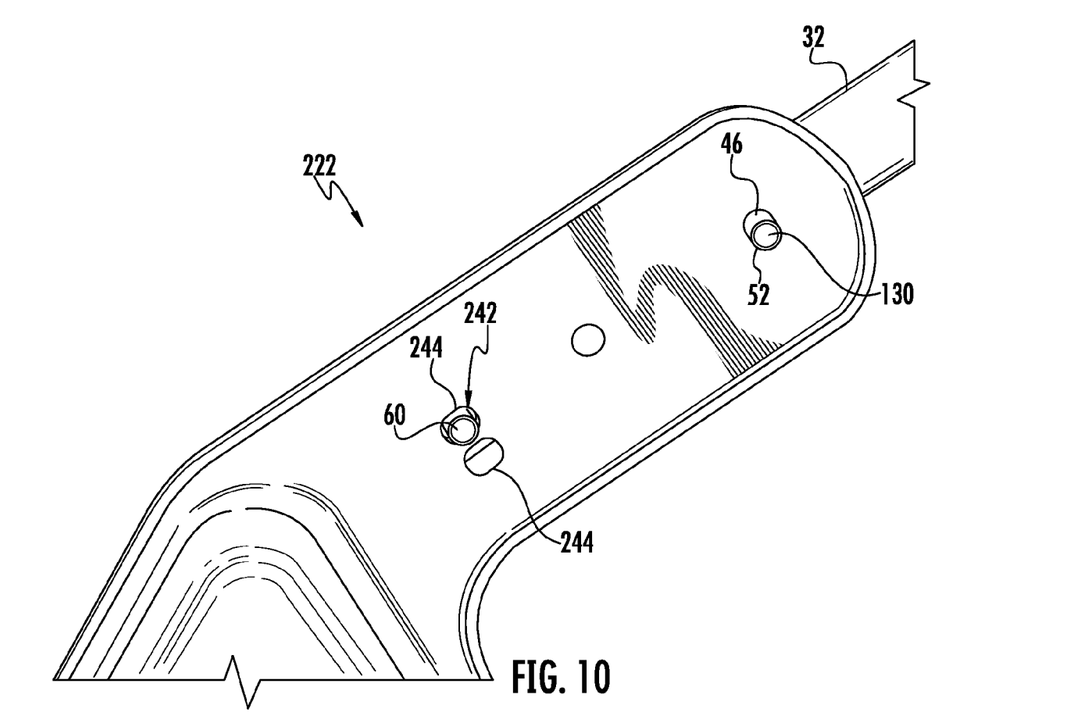
FIG. 10 is a fragmentary side elevational view of the handlebar mounting system of FIG. 9.

FIGS. 7 and 8 illustrate angular adjustment of handlebar 32 (shown in FIG. 1) using handlebar mounting system 22. FIG. 7 illustrates handlebar 32 retained in a first angular position by the positioning of retaining pin 60 in a first detent 44 of bracket 40. FIG. 8 illustrates handlebar 32 retained in a second angular position by the positioning of retaining pin 60 in a second detent 44. To move pin 60 from the first detent 44 to the second detent 44, a person grips manual grip 62 (shown in FIG. 6) and linearly translates manual grip 62 and retaining pin 60 and the direction indicated by arrow 102 so as to compress spring 58 and to withdraw retaining pin 60 from the first detent 44. Once manual grip 62 has been sufficiently moved so as to withdraw post 120 from recess 78, the person rotates manual grip 62 to position keying portions 124 opposite to plateau surface 96. Once so positioned, manual grip 62 may be released, whereby spring 58 resiliently biases pin 60 and manual grip 62 in the direction of arrow 100 (shown in FIG. 6) such that keying portions 124 are frictionally held against plateau surface 96 with retaining pin 60 being held in a retracted position, withdrawn from the first detent 44.

While retaining pin 60 is in the withdrawn position, handlebar 32 is rotated about axis 130 of pivot pin 46 to position retaining pin 60 opposite to the second detent 44. Once so positioned, the person once again rotates manual grip 62 to align keying portion 124 with side openings 94. Once such alignment has been achieved, spring 58 resilient urges post 120 into recess 92 and keying portions 124 into the side openings 94, allowing pin 162 return to the extended position, projecting into the second detent 44 to retain handlebar 32 in the alternate angular position shown in FIG. 8.

Overall, handlebar mounting system 22 couples or connects handlebar 32 to implement 20 such that angular positioning of handlebar 32 may be adjusted by pivoting handlebar 32 to a desired location and retaining handlebar 32 in the desired location using unit 42. Because unit 42 is configured to be formed as a single preassembled unit that is substantially independent of handlebar 32 and that merely receives handlebar 32, unit 42 may be preassembled as a single unit and inventoried. As a result, inventory costs are reduced and assembly is simplified. Because the actuation of retaining pin 60 and retention of retaining pin 60 in either the extended or withdrawn positions solely utilizes mechanical interaction with housing 50, independent of handlebar 32, unit 42 may be easily adapted for use with differently sized or configured handlebars 32. For example, unit 42 may be easily adapted for use with a handlebar 32 having a different shape or different outer size by simply changing the size or shape of the bore 70 during the molding or other fabrication of housing 50. The construction of the retaining pin guiding end 68 of unit 52 need not be altered.

FIGS. 9-14 illustrate handlebar mounting system 222, another example implementation of handlebar mounting system 22. Handlebar mounting system 222 is similar to handlebar mounting system 22 except that handlebar mounting system 222 includes bracket 240 and handlebar coupling and adjustment unit 242 in place of bracket 40 and unit 42. Bracket 240 is substantially similar to bracket 40 except that bracket 240 (shown in FIG. 10) includes a pair of alternate spaced detents 244 corresponding to different angular positions for handlebar 32. In other implementations, bracket 240 may include more than two spaced detents 244 for providing additional angular positions for handlebar 32.

Figure 14:
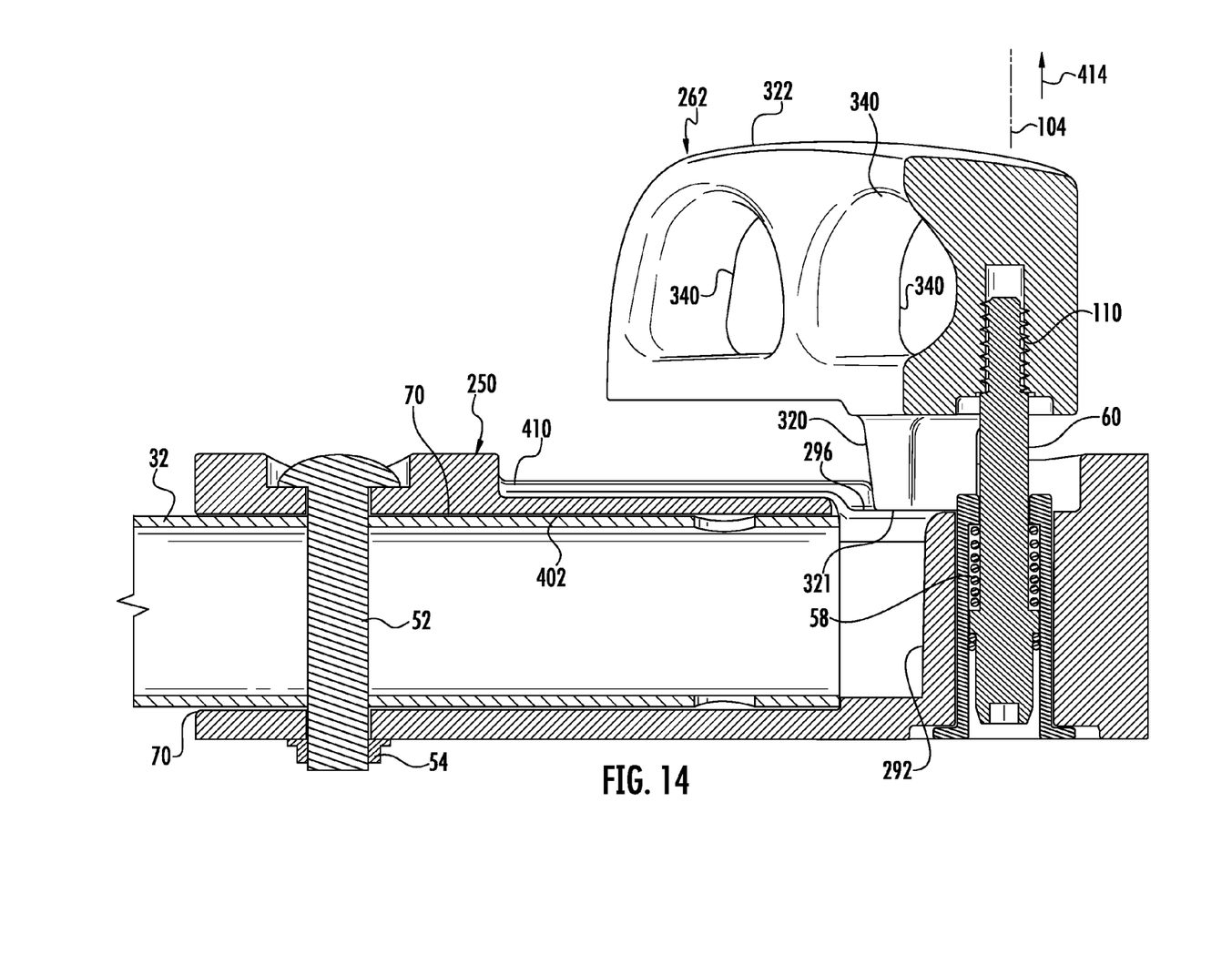
FIG. 14 is a sectional view of the handlebar coupling and adjustment unit of FIG. 13 positioned upon a handlebar with the retaining pin in the withdrawn position.

Handlebar coupling and adjustment unit 242 is similar to unit 42 except that unit 242 comprises a housing 250 and manual grip 262 in lieu of housing 50 and manual grip 62, respectively. Those remaining components of unit 252 which correspond to unit 52 are numbered similarly. As best shown by FIG. 14, which illustrates retaining pin 60 held in a retracted her withdrawn position, housing 250 is similar to housing 50 except that housing 250 omits collar 78 and alternatively includes recess 292 and plateau surface 296. Manual grip 262 comprises post 320 and gripping portion. 22.

Recess 292 comprises a detent or cavity extending into housing 250 eccentric to axis 104 of retaining pin 60. Recess 292 is sized, shaped and located so as to receive post 320 of manual grip 262 when post 320 is rotated about axis 104 to a position in alignment with recess 292.

Plateau surface 296 comprise a surface eccentric to axis 104 of pin 60 that contacts and abuts an end of post 320 to space or distance gripping portion 322 from housing 250 to retain or hold retaining pin 60 in the withdrawn position. Although plateau surface 296 is illustrated as a generally flat surface adjacent to recess 292, in other implementations, plateau surface 296 may have other configurations.

Figure 14A:
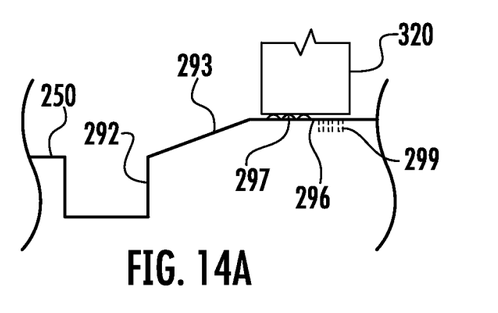
FIG. 14A is a fragmentary sectional view of another example of the handlebar coupling and adjustment unit of FIG. 14 with the retaining pin in the withdrawn position.
Figure 14B:
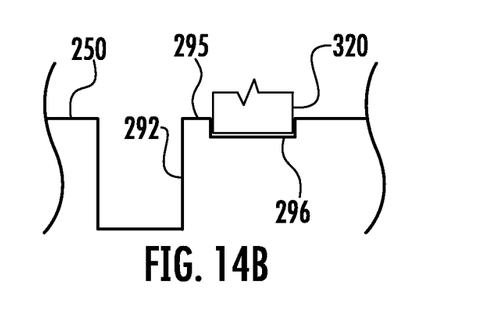
FIG. 14B is a fragmentary sectional view of another example of the handlebar coupling and adjustment unit of FIG. 14 with the retaining pin in the withdrawn position.

For example, as shown by FIG. 14A, in one implementation, plateau surface 292 may be at the end of a ramp 293, wherein post 320 is moved up along the ramp 293 onto plateau surface 296 when moving pin 60 to a withdrawn position. As shown by FIG. 14B, in one implementation, plateau surface 292 may be inset within a depression or may be bounded by ribs, wherein the sides of the depression or ribs provide a wall surface 295 that inhibits accidental movement or dislodgement of post 320 from plateau surface 296 into recess 292. In one implementation, plateau surface 292 may include roughened surfaces, ridges or dimples 297 (as shown in FIG. 14A) or may include serrations 299 (as shown in broken lines in FIG. 14A) to enhance frictional retention of post 320 in place upon plateau surface 296.

Post 320 projects from gripping portion 322 eccentric with respect to axis 104 of retaining pin 60. Post 320 is configured to be received within recess 292 and includes an axial face 321 that contacts plateau surface 296 when post 320 is withdrawn from recess 292. Post 320 has an axial length such that when post 320 is completely withdrawn from recess 292 and is resting upon plateau surface 296, retaining pin 60 is sufficiently retracted so as to be withdrawn from one of detents 244. Although illustrated as being rectangular, post 320 may have any of a variety of different sizes, shapes and configurations.

Gripping portion 322 comprises a structure connected to connecting portion 110 of retaining pin 60 that is configured to be manually pulled along axis and to be rotated about axis 104 once post 320 has been withdrawn from recess 292. In the example illustrated, gripping portion 322 eccentrically extends from axis 104 and includes a pair of finger openings 340 which are configured to receive a person's fingers to facilitate reliable gripping of gripping portion 322 as manual grip 262 is pulled and rotated. In other implementations, gripping portion 322 may have other configurations to facilitate manual gripping and movement of manual grip 262.

Figure 11:
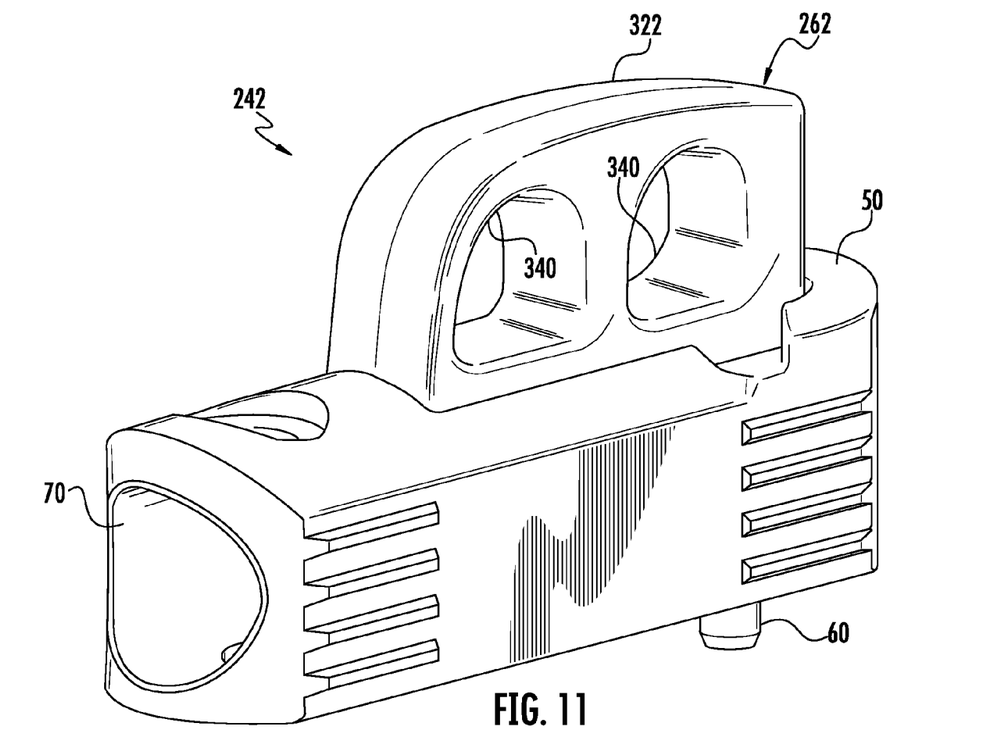
FIG. 11 is a perspective view of a handlebar coupling and adjustment unit of the mounting system of FIG. 10 with a retaining pin in an extended position.
Figure 12:
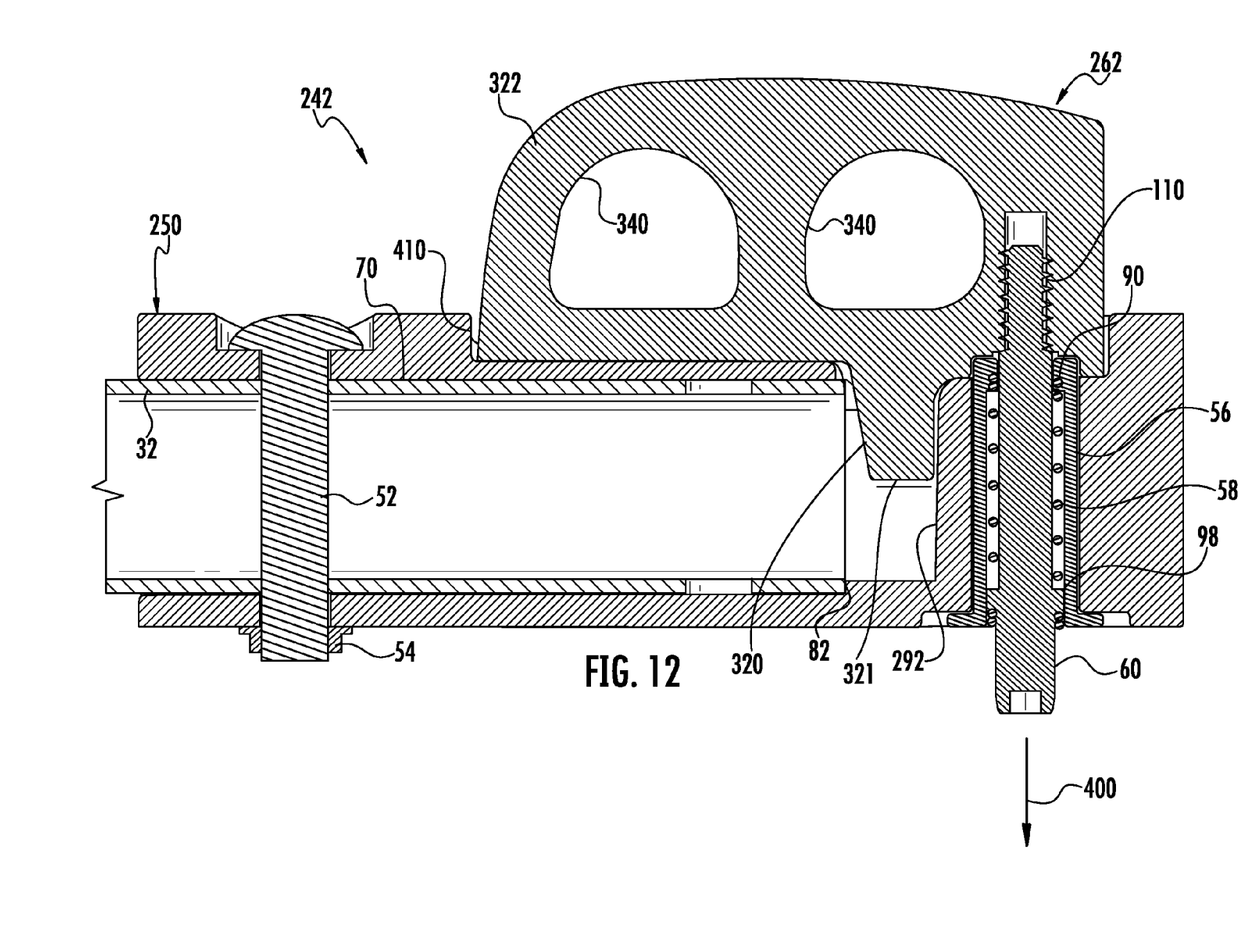
FIG. 12 is a sectional view of the handlebar coupling and adjustment unit of FIG. 11 positioned upon a handlebar with the retaining pin in the extended position.
Figure 13:
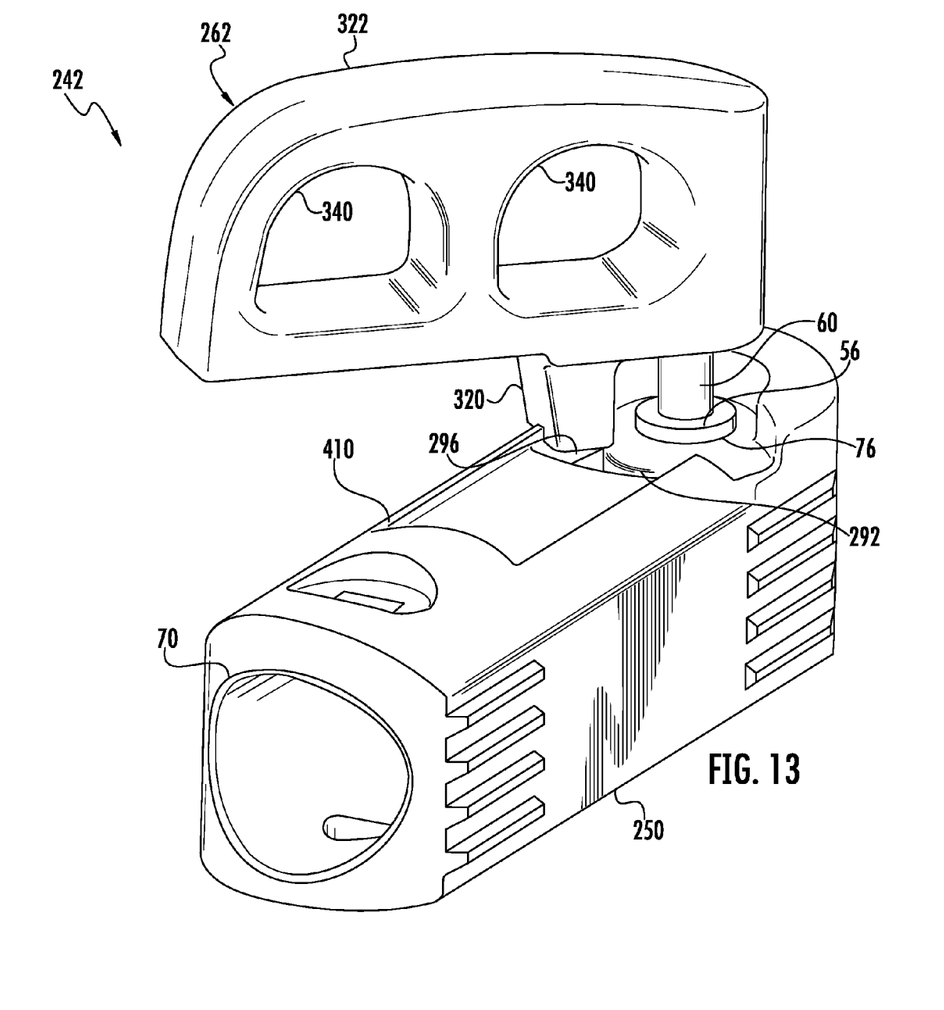
FIG. 13 is a perspective view of a handlebar coupling and adjustment unit of the mounting system of FIG. 10 with the retaining pin in a withdrawn position.

FIGS. 11-14 illustrate movement of retaining pin 60 from an extended position (shown in FIGS. 11 and 12) to a refracted or withdrawn position (shown in FIGS. 13 and 14). As shown by FIG. 12, when retaining pin 60 is in the extended position, projecting into one of detents 244 (shown in FIG. 10), post 320 is received within recess 292 and is resiliently biased in a direction indicated by arrow 400 by spring 58 so as to be retained within recess 292. Post 320 extends across and past an outer interior surface of bore 70. Post 320 also extends across and past and outer surface 402 of handlebar 32. Because recess 292 extends into housing 250, allowing post 320 to be stored in a space radially within the outer interior surface of bore 70 and the outer surface 402 of handlebar 32, unit 242 is more compact while retaining handlebar 32 in a desired angular orientation. As a result, unit 242 is less likely to accidentally catch upon external structures.

As further shown by FIGS. 11 and 12, when post 320 is received within recess 292, gripping portion 322 nests within a depression 410 along an exterior of housing 250. As shown by FIG. 11, gripping portion 322 has a profile or footprint equal or less than the profile or footprint of housing 250. As a result, gripping portion 322 does not project beyond housing 250, being less conspicuous, sleek in appearance and less likely to catch upon other structures.

As shown by FIGS. 13 and 14, a person may move retaining pin 60 to the withdrawn position shown by grasping gripping portion 322 and pulling retaining pin 60 in the direction indicated by arrow 414 in FIG. 14 against the bias a spring 58 until post 320 is withdrawn from recess 292. Thereafter, a person may manually rotate gripping portion 322 about axis 104 to position face 321 of post 320 opposite to plateau surface 296. As a result, surface 296 contacts face 321 to maintain retaining pin 60 in the withdrawn position while the person pivots handlebar 32 about axis 130 (shown in FIG. 10) to reposition retaining pin opposite to or in alignment with a different detent 244 with handlebar 32 at a different angular orientation. Once a desired angular orientation for handlebar 32 provided by one of detents 244 has been chosen, the person may rotate manual grip 262 to move post 320 from plateau surface 296 and into recess 292, wherein spring 58 resiliently urges retaining pin 260 into the selected detent 244.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible.

For example, unless specifically otherwise noted, the claims reciting a single particular element also encompass a plurality of such particular elements.

What is claimed is:

1. An apparatus comprising:
a handle bracket comprising:
a pivot aperture; and
a series of spaced detents;
a handlebar having an end portion; and
a handlebar coupling and adjustment unit comprising:
a housing receiving the end portion of the handlebar therein;
a pivot pin extending through the housing and the end portion to join the housing to the handlebar and extending through the pivot aperture to pivotally support the handlebar relative to the handle bracket;
a manual grip; and
a retaining pin connected to the manual grip and linearly translatable in a first direction by the manual grip from an extended positioned projecting into one of the detents to a withdrawn position, the manual grip being further rotatable while the retaining pin is in the withdrawn position between a locked position in which the housing contacts the manual grip to hold the manual grip with the retaining pin in the withdrawn position and an unlocked positioned in which the manual grip is linearly translatable in a second direction opposite to the first direction to return the retaining pin to the extended position.

2. The apparatus of claim 1 further comprising a spring, the spring resiliently biasing the pin in the second direction towards the extended position.

3. The apparatus of claim 1, wherein the manual grip and the retaining pin are carried by the housing beyond the end portion of the handle.

4. The apparatus of claim 1, wherein the housing comprises a sleeve having a closed-end, the closed-end supporting the manual grip and the retaining pin.

5. The apparatus of claim 1, wherein the spaced detents comprise a plurality of spaced openings through the bracket.

6. The apparatus of claim 1, wherein the retaining pin is resiliently biased by spring bearing against a shoulder of the retaining pin.

7. The apparatus of claim 1 further comprising a walk behind powered implement having a frame, wherein the handle bracket extends from the frame and wherein each of the plurality of detents corresponds to a different angle at which the handle extends from the frame.

8. The apparatus of claim 1, wherein the housing comprises a recess receiving a portion of the manual grip when the manual grip is in the locked position and a plateau surface contacting the portion of the manual grip when the manual grip is in the unlocked position.

9. The apparatus of claim 1, wherein the manual grip eccentrically extends from the retaining pin.

10. The apparatus of claim 1, wherein the manual grip comprises a post extending in the second direction, the housing including a recess receiving the post when the manual grip is in the locked position and a plateau surface contacting an end of the post when the manual grip is in the unlocked position.

11. The apparatus of claim 10, wherein an entirety of the post is supported radially outwardly beyond an outer surface of the handlebar when the manual grip is in the unlocked position and wherein the post extends across and past the outer surface of the handlebar when the manual grip is in the locked position.

12. The apparatus of claim 10, wherein an entirety of the post is supported radially outward beyond an outer surface of the handlebar when the manual grip is in the unlocked position and when the manual grip is in the unlocked position.

13. A handlebar coupling and adjustment unit comprising:
a housing having a bore to receive an end portion of a handlebar;
a pivot pin extending through the housing and the end portion to join the housing to the handlebar and adapted to extend through a pivot aperture of a handle bracket to pivotally support the handlebar relative to the handle bracket;
a manual grip; and
a retaining pin connected to the manual grip and linearly translatable in a first direction by the manual grip from an extended positioned projecting beyond the housing to a withdrawn position within the housing, the manual grip being further rotatable while the retaining pin is in the withdrawn position between a locked position in which the housing contacts the manual grip to hold the manual grip with the retaining pin in the withdrawn position and an unlocked positioned in which the manual grip is linearly translatable in a second direction opposite to the first direction to return the retaining pin to the extended position.

14. The handlebar coupling and adjustment unit of claim 13, wherein the housing comprises a sleeve having a closed-end, the closed-end supporting the manual grip and the retaining pin.

15. The handlebar coupling and adjustment unit of claim 13, wherein the housing comprises a recess receiving a portion of the manual grip when the manual grip is in the locked position and a plateau surface contacting the portion of the manual grip when the manual grip is in the unlocked position.

16. The handlebar coupling and adjustment unit of claim 13, wherein the manual grip eccentrically extends from the retaining pin.

17. The handlebar coupling and adjustment unit of claim 13, wherein the manual grip comprises a post extending in the second direction, the housing including a recess receiving the post when the manual grip is in the locked position and a plateau surface contacting an end of the post when the manual grip is in the unlocked position.

18. The handlebar coupling and adjustment unit of claim 13, wherein an entirety of the post is supported radially outwardly beyond the bore of the housing when the manual grip is in the unlocked position and wherein the post extends across and past the bore of the housing when the manual grip is in the locked position.

19. The handlebar coupling and adjustment unit of claim 13, wherein an entirety of the post is supported radially outward beyond the bore of the housing when the manual grip is in the unlocked position and when the manual grip is in the unlocked position.

20. A method comprising:
sliding a housing over an end portion of a handlebar;
passing a pivot pin through the housing, through the end portion of the handlebar and through a pivot aperture in a handle bracket to join the housing to the handlebar and to pivotally support the handlebar relative to the handle bracket;
inserting an end of a retaining pin through an end of the housing against a spring captured between the retaining pin and the housing;
securing a manual grip to the end of the retaining pin.

21. The method of claim 20 further comprising:
- linearly translating the manual grip and the retaining pin against the spring to a withdrawn position in which an end of the retaining pin is contained within the housing; and
- rotating the manual grip to a position in contact with the housing such that the retaining pin is held in the withdrawn position by the housing.

\* \* \* \* \*